United States Patent
Enoki et al.

(10) Patent No.: US 9,031,923 B2
(45) Date of Patent: May 12, 2015

(54) SYSTEM FOR ACCESSING SHARED DATA USING MULTIPLE APPLICATION SERVERS

(71) Applicant: International Business Machines Corporation, Armonk, NY (US)

(72) Inventors: Miki Enoki, Kanagawa-ken (JP); Hiroshi Horii, Kanagawa-ken (JP); Tamiya Onodera, Tokyo (JP); Yohsuke Ozawa, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/082,371

(22) Filed: Nov. 18, 2013

(65) Prior Publication Data
US 2014/0082127 A1    Mar. 20, 2014

Related U.S. Application Data

(63) Continuation of application No. 12/571,496, filed on Oct. 1, 2009, now Pat. No. 8,589,438.

(30) Foreign Application Priority Data

Oct. 6, 2008  (JP) ................. 2008-259926

(51) Int. Cl.
G06F 17/30 (2006.01)
G06F 7/02 (2006.01)
H04L 29/08 (2006.01)
G06F 9/52 (2006.01)

(52) U.S. Cl.
CPC ...... *H04L 67/1097* (2013.01); *G06F 17/30171* (2013.01); *G06F 9/52* (2013.01); *G06F 17/30362* (2013.01)

(58) Field of Classification Search
CPC ................. G06F 17/30171; G06F 17/30194; G06F 17/30; G06F 17/30165
USPC .................. 707/999.001, 999.002, 999.008, 707/999.009, 999.01, 999.107, 704, 781, 707/783
See application file for complete search history.

(56) References Cited

U.S. PATENT DOCUMENTS

| | | | |
|---|---|---|---|
| 7,487,228 B1 * | 2/2009 | Preslan et al. | 709/219 |
| 8,589,438 B2 | 11/2013 | Enoki | |
| 2002/0019874 A1 * | 2/2002 | Borr | 709/229 |
| 2002/0095403 A1 * | 7/2002 | Chandrasekaran et al. | 707/1 |
| 2003/0225884 A1 | 12/2003 | Hayden | |
| 2005/0289143 A1 | 12/2005 | Oshri | |

(Continued)

FOREIGN PATENT DOCUMENTS

| | | |
|---|---|---|
| CN | 1662903 | 8/2005 |
| JP | 62-140159 A | 6/1987 |

(Continued)

*Primary Examiner* — Bruce Moser
(74) *Attorney, Agent, or Firm* — Jennifer R. Davis; Otterstedt, Ellenbogen & Kammer, LLP

(57) ABSTRACT

A system including multiple application servers for accessing shared data and a centralized control unit for centrally controlling a lock applied to the shared data by each of the application servers. Each application server includes a distributed control unit for controlling a lock applied to the shared data by the application server and a selection unit for selecting any one of distributed mode in which a lock is acquired from the distributed control unit or a centralized mode in which a lock is acquired from the centralized control unit.

6 Claims, 8 Drawing Sheets

| MODE BEFORE CHANGE | MODE AFTER CHANGE | CHANGE CONDITION |
|---|---|---|
| DISTRIBUTED MODE | PRE-CENTRALIZED MODE | WHEN UPDATING SHARED DATA OR IF AT LEAST ONE OF OTHER APPLICATION SERVERS IS IN PRE-CENTRALIZED MODE |
| PRE-CENTRALIZED MODE | CENTRALIZED READ MODE | IF EACH APPLICATION SERVER IS IN ANY ONE OF PRE-CENTRALIZED MODE, CENTRALIZED READ MODE, AND CENTRALIZED UPDATE MODE |
| CENTRALIZED READ MODE | CENTRALIZED UPDATE MODE | WHEN UPDATING SHARED DATA |
| CENTRALIZED UPDATE MODE | CENTRALIZED READ MODE | WHEN FINISHING UPDATING SHARED DATA |
| CENTRALIZED READ MODE | PRE-DISTRIBUTED MODE | IF EACH APPLICATION SERVER IS IN ANY ONE OF CENTRALIZED READ MODE AND CENTRALIZED UPDATE MODE OR IF AT LEAST ONE APPLICATION SERVER IS IN PRE-DISTRIBUTED MODE |
| PRE-DISTRIBUTED MODE | DISTRIBUTED MODE | IF EACH APPLICATION SERVER IS IN ANY ONE OF PRE-DISTRIBUTED MODE, DISTRIBUTED MODE, AND PRE-CENTRALIZED MODE |

(56) References Cited

U.S. PATENT DOCUMENTS

2007/0088762 A1 4/2007 Harris
2007/0185872 A1 8/2007 Ho
2008/0243847 A1* 10/2008 Rasmussen .................. 707/8
2009/0094243 A1 4/2009 Oshri

FOREIGN PATENT DOCUMENTS

| JP | 08-202567 A | 8/1996 |
| JP | 2005-534081 A | 11/2005 |
| WO | WO03025751 | 3/2003 |

* cited by examiner

FIG. 3

ITEM TABLE

| COLUMN | TYPE | DESCRIPTION |
|---|---|---|
| ITEM_ID | INTEGER | ITEM IDENTIFIER |
| ITEM_NAME | STRING | ITEM NAME |
| ITEM_PRICE | STRING | ITEM PRICE |

FIG. 4

READ QUERY

| SELECT ITEM_ID FROM ITEM WHERE ITEM_PRICE ≥ $from AND ITEM_PRICE < $to |
|---|

FIG. 5

ITEM TABLE CACHE

| KEY ($from, $to) | VALUE (ITEM_ID LIST) |
|---|---|
| (0, 10) | (1, 4, 10, 20) |
| (20, 30) | (5, 7, 9, 11, 40) |
| (40, 60) | (13, 17, 23) |

FIG. 7

| MODE BEFORE CHANGE | MODE AFTER CHANGE | CHANGE CONDITION |
|---|---|---|
| DISTRIBUTED MODE | PRE-CENTRALIZED MODE | WHEN UPDATING SHARED DATA OR IF AT LEAST ONE OF OTHER APPLICATION SERVERS IS IN PRE-CENTRALIZED MODE |
| PRE-CENTRALIZED MODE | CENTRALIZED READ MODE | IF EACH APPLICATION SERVER IS IN ANY ONE OF PRE- CENTRALIZED MODE, CENTRALIZED READ MODE, AND CENTRALIZED UPDATE MODE |
| CENTRALIZED READ MODE | CENTRALIZED UPDATE MODE | WHEN UPDATING SHARED DATA |
| CENTRALIZED UPDATE MODE | CENTRALIZED READ MODE | WHEN FINISHING UPDATING SHARED DATA |
| CENTRALIZED READ MODE | PRE-DISTRIBUTED MODE | IF EACH APPLICATION SERVER IS IN ANY ONE OF CENTRALIZED READ MODE AND CENTRALIZED UPDATE MODE OR IF AT LEAST ONE APPLICATION SERVER IS IN PRE-DISTRIBUTED MODE |
| PRE-DISTRIBUTED MODE | DISTRIBUTED MODE | IF EACH APPLICATION SERVER IS IN ANY ONE OF PRE-DISTRIBUTED MODE, DISTRIBUTED MODE, AND PRE-CENTRALIZED MODE |

FIG. 8

| | READ OF CACHE | READ OF DATABASE | UPDATE OF DATABASE |
|---|---|---|---|
| DISTRIBUTED MODE | PERMITTED | PERMITTED | PROHIBITED |
| PRE-CENTRALIZED MODE | PROHIBITED | PERMITTED | PROHIBITED |
| CENTRALIZED READ MODE | PROHIBITED | PERMITTED | PROHIBITED |
| CENTRALIZED UPDATE MODE | PROHIBITED | PERMITTED | PERMITTED |
| PRE-DISTRIBUTED MODE | PROHIBITED | PERMITTED | PROHIBITED |

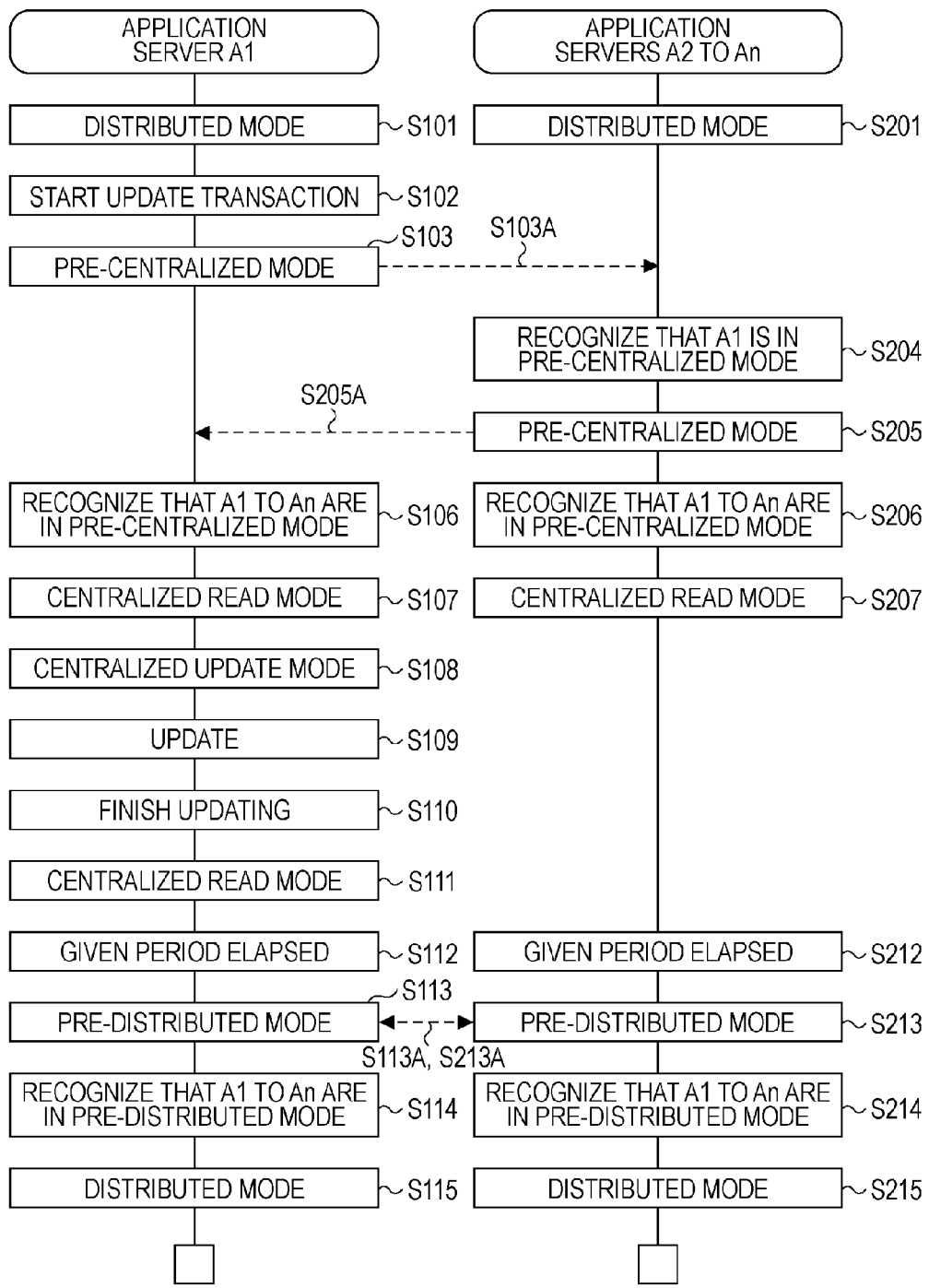

SYSTEM FOR ACCESSING SHARED DATA USING MULTIPLE APPLICATION SERVERS

CROSS REFERENCE TO RELATED APPLICATION

This application is a continuation of U.S. patent application Ser. No. 12/571,496, filed Oct. 1, 2009, which in turn claims priority under 35 U.S.C. §119 from Japanese Patent Application No. 2008-259926 filed Oct. 6, 2008. The complete disclosures of U.S. patent application Ser. No. 12/571, 496 and Japanese Patent Application No. 2008-259926 are both expressly incorporated herein by reference in their entireties for all purposes.

BACKGROUND OF THE INVENTION

1. Field of the Invention

This invention relates generally to a system for accessing shared data using multiple application servers. More particularly, it invention relates to a method, system, and computer program for use in accessing shared data using multiple application servers.

2. Description of the Related Art

There is known a system which includes a database server storing a database and multiple application servers for accessing the database. Such a system causes each application server to cache the result of a read of the database, thereby reducing the load imposed on the database server.

In a system causing each application server to cache the result of a read of the database, a lock control must be performed among the multiple application servers in order to prevent a read of cached data inconsistent with the database. Examples of a lock control method include the distributed-lock method in which each application server controls a lock individually, and the centralized-lock method in which a lock server or the like centrally controls a lock. Hereafter, a lock control performed using the distributed-lock method will be referred to as "cache mode" and a lock control performed using the centralized-lock method will be referred to as "database mode."

If an application server reads a database in a system that is using cache mode, the application server acquires a locally controlled read lock before reading the database. Also, if the application server updates the database in the system that is using cache mode, the application server acquires an exclusive lock controlled by each of the other application servers before updating the database. On the other hand, if an application server reads or updates a database in a system which is using database mode, the application server acquires a read lock or an exclusive lock controlled by a lock server before reading or updating the database.

As for cache mode, the latency caused when acquiring a read lock is short. However, an exclusive lock must be acquired from each of multiple application servers. This complicates the process. On the other hand, as for database mode, it is sufficient to only acquire one exclusive lock from a lock server. This simplifies the process. However, the latency caused when acquiring a read lock is long. Therefore, cache mode is preferably used in a system for realizing an application where a read of a database frequently occurs, and database mode is preferably used in a system for realizing an application where an update of a database frequently occurs.

In a system for realizing bank operations or the like, a read of a database occurs more frequently than a database update during daytime hours. A batch update of the database is performed during the nighttime when the database is used by users less frequently. If cache mode is used in such a system, the operation efficiency is increased during the daytime when a read of the database occurs more frequently. However, the operation efficiency is reduced during the nighttime when a batch update is performed. In contrast, if database mode is used in such a system, the operation efficiency is increased during the nighttime when a batch update is performed; however, the operation efficiency is reduced during the daytime when a read of the database occurs more frequently. Therefore, it is difficult to increase the operation efficiency regardless of the time of day in a system for realizing an application where an update of a database occurs more frequently during a particular time period.

SUMMARY OF THE INVENTION

One aspect of the present invention provides a system including a plurality of application servers for accessing shared data and a centralized control unit for centrally controlling a lock applied to the shared data by each of the application servers. Each of the application servers includes a distributed control unit for controlling a lock applied to the shared data by the application server and a selection unit for selecting any one of a distributed mode in which a lock is acquired from the distributed control unit or a centralized mode in which a lock is acquired from the centralized control unit.

In another aspect, the present invention provides an application server for accessing shared data in a system, wherein the system includes a plurality of application servers and a centralized control unit for centrally controlling a lock applied to shared data by each of the application servers. The application server includes: a distributed control unit for controlling a lock applied to the shared data by the application server; and a selection unit for selecting any one of a distributed mode in which a lock is acquired from the distributed control unit or a centralized mode in which a lock is acquired from the centralized control unit.

In still another aspect, the present invention provides a method for causing a computer to function as an application server for accessing shared data for use in a system including a plurality of application servers and a centralized control unit for centrally controlling a lock applied to shared data by each of the application servers being included in the system. The method includes the steps of: causing the computer to function as a distributed control unit for controlling a lock applied to the shared data by a corresponding application server; and causing the computer to function as a selection unit for selecting any one of distributed mode in which a lock is acquired from the distributed control unit and centralized mode in which a lock is acquired from the centralized control unit.

In still another aspect, the present invention provides an article of manufacture tangibly embodying computer readable instructions which, when implemented, causes a computer to carry out the steps of the above method.

BRIEF DESCRIPTION OF THE DRAWINGS

FIG. 3 shows an example of a schema defining the data structure of shared data (ITEM table).

FIG. 4 shows an example of a read query for reading a value from the ITEM table shown in FIG. 3.

FIG. 5 shows an example of data cached by a cache unit 56.

FIG. 7 shows an example of change conditions for changing the mode from one to another.

FIG. 8 shows an example of a table indicating whether a read of the cache is permitted or prohibited in each mode, whether a read of the database is permitted or prohibited in each mode, and whether an update of the database is permitted or prohibited in each mode.

FIG. 9 shows an example of the flows of processes performed by one application server 30 (A1) and processes performed by the other multiple application servers 30 (A2 to An) in the information processing system 10.

DETAILED DESCRIPTION OF THE PREFERRED EMBODIMENTS

Figure 1:
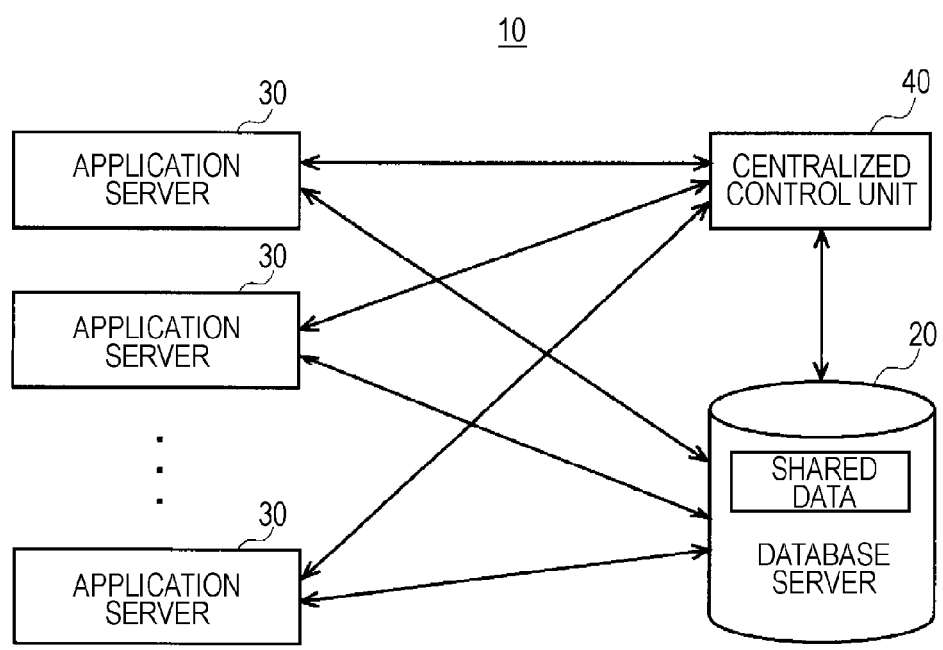
FIG. 1 shows a configuration of an information processing system 10 according to an embodiment of the present invention.

The present invention is described using the embodiments thereof. However, the embodiment does not limit the invention as set forth in the appended claims. Also, not all combinations of the features described in the embodiment are essential as the means of solving the above-mentioned problem.

REFERENCE NUMERALS

10: information processing system
20: database server
30: application server
40: centralized control unit
52: execution unit
54: access control unit
56: cache unit 56
58: distributed control unit
60: selection unit
1900: computer
2000: CPU
2010: ROM
2020: RAM
2030: communication interface
2040: hard disk drive
2050: flexible disk drive
2060: CD-ROM drive
2070: input/output chip
2075: graphic controller
2080: display
2082: host controller
2084: input/output controller
2090: flexible disk
2095: CD-ROM Referring to FIG. 1, a configuration of an information processing system 10 according to one embodiment of the invention is shown. The information processing system 10 includes a database server 20, multiple application servers 30, and a centralized control unit 40.

The database server 20 is storing shared data. In this embodiment, the shared data is a table included in a database.

The multiple application servers 30 each execute an application program. Each application server 30 processes information written in an application program. Also, each application server 30 accesses the shared data stored in the database server 20 via a network in accordance with the description of the application program. In other words, each application server 30 reads and updates the shared data.

The centralized control unit 40 centrally controls locks applied to the shared data by the application servers 30. In this embodiment, the centralized control unit 40 controls a lock with respect to each of records of the shared data.

More specifically, if the centralized control unit 40 receives a request for acquiring a read lock with respect to one record, from one application server 30, it permits the application server 30 to acquire the read lock, provided that none of the other application servers 30 has acquired an exclusive lock. Also, if the centralized control unit 40 receives a request for acquiring an exclusive lock with respect to one record, from one application server 30, it permits the application server 30 to acquire the exclusive lock, provided that each of the other application servers 30 has acquired none of a read lock and an exclusive lock. Thus, the application servers 30 are allowed to read and update the shared data without causing data inconsistency among one another. The database server 20 and centralized control unit 40 may be controlled by an identical system.

Figure 2:
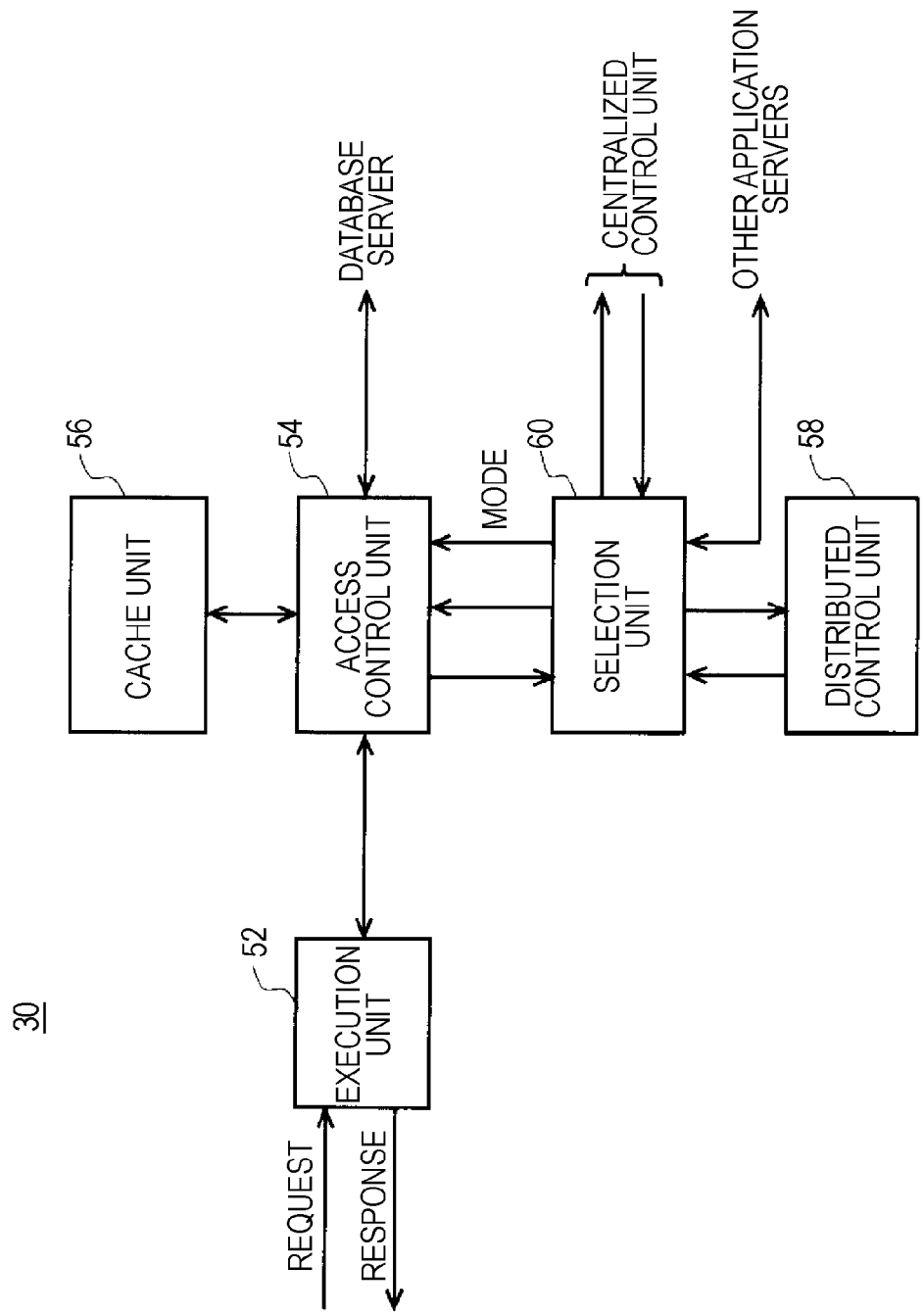
FIG. 2 shows a configuration of each of multiple application servers 30.

FIG. 2 shows a configuration of each application server 30. Each application server 30 includes an execution unit 52, an access control unit 54, a cache unit 56, and a distributed control unit 58. Each application server 30 thus configured is realized when a computer executes a program.

The execution unit 52 processes information written in an application program. The execution unit 52 performs a process corresponding to, for example, a given request and sends back the result of the process as a response. Also, if the execution unit 52 performs a process for reading or updating the shared data, it issues a read request or an update request to the database server 20 via the access control unit 54. The execution unit 52 may issue a read request or an update request written in, for example, SQL (structured query language).

The access control unit 54 sends the request for reading or updating the shared data issued by the execution unit 52, to the database server 20 via a network. Subsequently, the access control unit 54 acquires the result of a process corresponding to the sent request, from the database server 20 and sends the process result back to the execution unit 52.

If the access control unit 54 starts a transaction to access the database server 20, it acquires a lock from the centralized control unit 40 or distributed control unit 58 via a selection unit 60. More specifically, if the access control unit 54 starts a transaction including an update request (hereafter referred to as an "update transaction"), it acquires an exclusive lock. Also, if the access control unit 54 starts a transaction not including an update request (hereafter referred to as a "read transaction"), it acquires a read lock. If the access control unit 54 cannot acquire a lock, it does not access the shared data.

The transaction here refers to, for example, a set of inseparable multiple processes performed between the application server 30 and database server 20. If the database server 20 is, for example, an SQL server, the transaction refers to a series of processes from "begin" to "commit" or "rollback."

The cache unit 56 caches the shared data read by the access control unit 54. After a transaction is completed, the cache unit 56 may invalidate the cached shared data.

The distributed control unit 58 controls a lock applied to the shared data by the application server 30. In this embodiment, the distributed control unit 58 controls a lock with respect to each of records of the shared data.

More specifically, if the distributed control unit 58 receives a request for acquiring a read lock with respect to one record, from the access control unit 54, it permits the access control unit 54 to acquire the read lock, provided that none of the access control units 54 of the other application servers 30 has acquired an exclusive lock. Also, if the distributed control unit 58 receives a request for acquiring an exclusive lock with respect to one record, from the access control unit 54, it makes inquiries to the other application servers 30. If each of the other application servers 30 has acquired none of a read lock and an exclusive lock, the distributed control unit 58 permits the access control unit 54 to acquire the exclusive lock. In this way, the distributed control unit 58 allows the application server 30 to read and update the shared data without causing data inconsistency between the application server 30 and the other application servers 30.

The selection unit 60 selects any one of distributed mode in which a lock is acquired from the distributed control unit 58 and centralized mode in which a lock is acquired from the centralized control unit 40. If the selection unit 60 receives a request for acquiring a lock from the access control unit 54 in distributed mode, it provides the request to the distributed control unit 58 so that the access control unit 54 acquires the lock from the distributed control unit 58. Also, if the selection unit 60 receives a request for acquiring a lock from the access control unit 54 in centralized mode, it provides the request to the centralized control unit 40 via a network so that the access control unit 54 acquires the lock from the centralized control unit 40.

Incidentally, the selection unit 60 communicates with the respective selection units 60 of the other application servers 30. If at least one of the other application servers 30 intends to update the shared data, the selection unit 60 changes the mode to centralized mode. If none of the other application servers 30 is updating the shared data, the selection unit 60 changes the mode to distributed mode. In distributed mode, the access control unit 54 permits a read of the shared data and prohibits an update thereof. In centralized mode, the access control unit 54 permits both a read of the shared data and an update thereof.

As described above, if one application server 30 updates the shared data, the application server 30 acquires an exclusive lock from the centralized control unit 40. This prevents interactions between the other application servers 30 and the database server 20. Also, if the application server 30 reads the shared data, it acquires a read lock from the distributed control unit 58. Thus, the latency caused when acquiring the read lock is reduced. That is, the application servers 30 according to this embodiment are allowed to efficiently perform distributed lock control.

FIG. 3 shows an example of a schema defining the data structure of the shared data (ITEM table).

FIG. 4 shows an example of a read query for reading a value from the ITEM table shown in FIG. 3.

FIG. 5 shows an example of data cached by the cache unit 56.

The cache unit 56 stores a result obtained by reading the shared data stored in the database server 20, for example, using a read query written in SQL. For example, assume that the database server 20 is storing, as the shared data, an ITEM table as shown in the schema of FIG. 3. In this case, if the access control unit 54 issues a read query shown in FIG. 4 to the database server 20, it acquires a query result as shown in FIG. 5 from the database server 20. Then, the cache unit 56 caches the query result acquired by the access control unit 54.

Subsequently, if the access control unit 54 again receives a request for reading all or a part of the data shown in FIG. 5, from the execution unit 52, it acquires the above-mentioned query result as the shared data from the cache unit 56, rather than issuing a read query to the database server 20, and sends back the query result to the execution unit 52. Thus, the access control unit 54 reduces the load imposed on the database server 20, as well as reduces the latency caused when reading the shared data.

Figure 6:
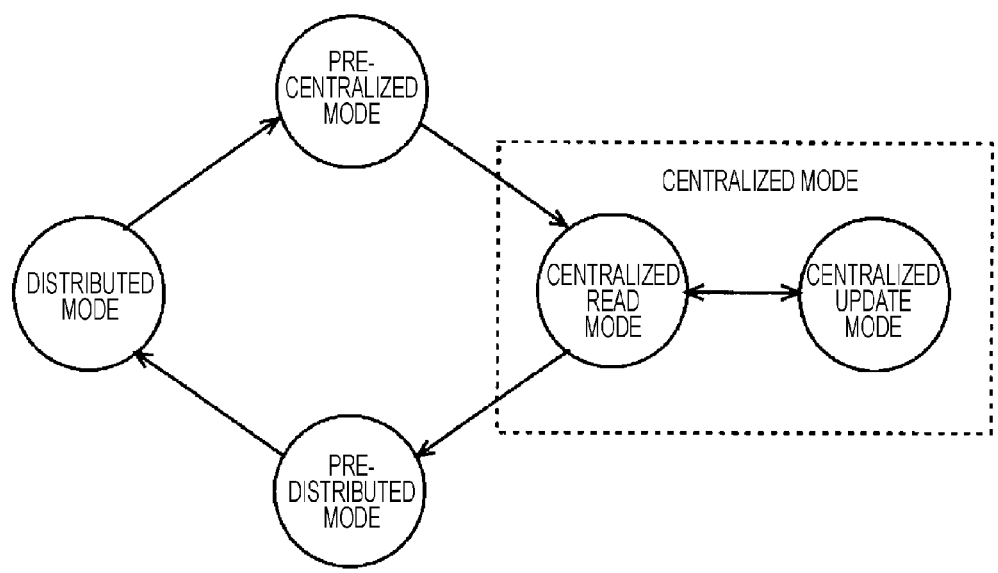
FIG. 6 shows an example of modes selected by a selection unit 60.

FIG. 6 shows an example of modes selected by the selection unit 60. FIG. 7 shows an example of change conditions for changing from one mode to another. As shown in FIGS. 6 and 7, the selection unit 60 selects any one of distributed mode, pre-centralized mode used when changing from distributed mode to centralized mode, centralized read mode, which is one type of centralized mode, centralized update mode, which is one type of centralized mode, and pre-distributed mode used when changing from centralized mode to distributed mode.

If one application server 30 updates the shared data in distributed mode, the selection unit 60 thereof changes the mode from distributed mode to centralized mode. For example, if the application server 30 starts an update transaction, the selection unit 60 changes the mode from distributed mode to pre-centralized mode. Also, if at least one of the other application servers 30 is placed in pre-centralized mode when the application server 30 is placed in distributed mode, the selection unit 60 changes the mode from distributed mode to centralized mode. That is, if any one of the application servers 30 updates the shared data (for example, if any one of the application servers 30 starts an update transaction), the modes of all the application servers 30 are changed from distributed mode to pre-centralized mode.

If each of the other application servers 30 is placed in any one of pre-centralized mode, centralized read mode, and centralized update mode, which is a type of centralized mode, if the application server 30 is placed in pre-centralized mode, the selection unit 60 changes the mode from pre-centralized mode to centralized read mode, which is a type of centralized mode. That is, each application server 30 may change the mode to centralized mode (centralized read mode or pre-centralized mode) if the modes of the other application servers 30 have been changed from distributed mode to pre-centralized mode. The application servers 30 may change the modes from pre-centralized mode to centralized read mode in synchronization with one another.

If the application server 30 updates the shared data in centralized read mode, the selection unit 60 changes the mode from centralized read mode to centralized update mode. For example, if the application server 30 performs an update transaction, the selection unit 60 changes the mode from centralized read mode to centralized update mode.

If the application server 30 finishes updating the shared data in centralized update mode, the selection unit 60 changes the mode from centralized update mode to centralized read mode. For example, if the application server 30 finishes all update transactions, the selection unit 60 changes the mode from centralized update mode to centralized read mode.

Also, if each of the other application servers 30 is placed in any one of centralized read mode and centralized update mode when the application server 30 is placed in centralized read mode or if at least one of the other application servers 30 is placed in pre-distributed mode when the application server 30 is placed in centralized read mode, the selection unit 60 changes the mode from centralized read mode to pre-distributed mode. Also, if a given period has elapsed after the change of the mode to centralized read mode, the selection unit 60 may change the mode from centralized read mode to pre-distributed mode. That is, if none of the application server 30 does not update the shared data in centralized mode, the application servers 30 may change the modes to pre-distributed mode.

If each of the other application servers 30 is placed in any one of pre-distributed mode, distributed mode, and pre-centralized mode when the application server 30 is placed in pre-distributed mode, the selection unit 60 changes the mode from pre-centralized mode to distributed mode. That is, each application server 30 may change the mode to distributed mode if the other application servers 30 have changed the modes from centralized mode to pre-distributed mode. The application servers 30 may change the modes from pre-distributed mode to distributed mode in synchronization with one another.

Also, the application servers 30 may be configured so that if one application server 30 updates the shared data in pre-distributed mode, the selection unit 60 thereof changes the mode from pre-distributed mode to centralized read mode, provided that each of the other application servers 30 is placed in any one of pre-distributed mode, centralized read mode, and centralized update mode. In this case, if the application server 30 updates the shared data in pre-distributed mode (for example, if the application server 30 starts an update transaction), the application server 30 is allowed to change the mode from pre-distributed mode to centralized update mode via centralized read mode.

FIG. 8 shows an example of a table indicating whether a read of the cache is permitted or prohibited in each mode, whether a read of the database is permitted or prohibited in each mode, and whether an update of the database is permitted or prohibited in each mode. In distributed mode, the selection unit 60 thereof acquires a lock from the distributed control unit 58. In pre-centralized mode, centralized read mode, centralized update mode, and pre-distributed mode, the selection unit 60 acquires a lock from the centralized control unit 40.

If the selection unit 60, which has acquired a lock from the distributed control unit 58 in distributed mode, changes the mode from distributed mode to pre-centralized mode, it acquires a lock from the centralized control unit 40 and releases the lock acquired from the distributed control unit 58. Also, if the selection unit 60, which has acquired a lock from the centralized control unit 40 in pre-distributed mode, changes the mode from pre-distributed mode to distributed mode, it acquires a lock from the distributed control unit 58 and releases the lock acquired from the centralized control unit 40. Thus, when the selection unit 60 changes the destination, from which the selection unit 60 acquires a lock, from one to another, occurrence of data inconsistency is prevented.

As shown in FIG. 8, in distributed mode, the access control unit 54 permits both a read of the shared data cached in the cache unit 56 and a read of the shared data stored in the database server 20. That is, the access control unit 54 reads the shared data using the cache unit 56 in distributed mode. Thus, in distributed mode, the access control unit 54 reduces the load imposed on the database server 20, as well as accesses the shared data at higher speed. Also, in distributed mode, the access control unit 54 prohibits an update of the shared data stored in the database server 20. Therefore, the access control unit 54 does not need to acquire an exclusive lock from each of the other application servers 30 in distributed mode. This simplifies distributed lock control.

As shown in FIG. 8, in centralized update mode, the access control unit 54 prohibits a read of the shared data cached in the cache unit 56 and permits a read of the shared data stored in the database server 20. That is, in centralized update mode, the access control unit 54 reads the shared data without using the cache unit 56. Also, in centralized update mode, the access control unit 54 permits an update of the shared data stored in the database server 20. In other words, the access control unit 54 prohibits access to the cache in centralized update mode. This prevents occurrence of data inconsistency.

As shown in FIG. 8, in pre-centralized mode, centralized read mode, and pre-distributed mode, the access control unit 54 prohibits a read of the shared data cached in the cache unit 56 and permits a read of the shared data stored in the database server 20. That is, in pre-centralized mode, centralized read mode, and pre-distributed mode, the access control unit 54 reads the shared data without using the cache unit 56. Also, in pre-centralized mode, centralized read mode, and pre-distributed mode, the access control unit 54 prohibits an update of the shared data stored in the database server 20. This is, when the mode is changed from distributed mode to centralized update mode and when the mode is changed from centralized update mode to distributed mode, the access control unit 54 prohibits access to the cache. This prevents occurrence of data inconsistency.

Also, if the selection unit 60 changes the mode from pre-distributed mode to distributed mode, it may invalidate the shared data cached in the cache unit 56. Also, if, when changing the mode from pre-distributed mode to distributed mode, the selection unit 60 is notified that data included in the shared data cached in the cache unit 56 has been updated by any one of the application servers 30, the selection unit 60 may selectively invalidate the data. Thus, the selection unit 60 prevents an inconsistency between the shared data cached in the cache unit 56 and the shared data stored in the database server 20.

FIG. 9 shows an example of the flows of processes performed by one application server (30A1) and processes performed by the other application servers (30A2 to 30An) in the information processing system 10. If the application server 30A1 starts an update transaction when all the application servers 30A1 to 30An are placed in distributed mode, the application server 30A1 and the other application servers 30A2 to 30An perform operations in accordance with the corresponding flows shown in FIG. 9.

First, when the application server 30A1 starts an update transaction, it changes the mode to pre-centralized mode (S101, S102, S103). The other application servers 30A2 to 30An each receive notification (S103A) from the application server 30A1 and recognizes that the application server 30A1 is placed in pre-centralized mode and then each change the mode to pre-centralized mode (S201, S204, S205). As a result, all the application servers 30A1 to 30An are placed in pre-centralized mode.

The application servers 30A1 to 30An receive notification (S205A) from one another and recognize that all the application servers 30A1 to 30An are placed in pre-centralized mode (S106, S206) and then change the modes to centralized read mode (S107, S207). In this case, the application servers 30A1 to 30An may change the modes from pre-centralized mode to centralized read mode in synchronization with one another.

Subsequently, when a given period has elapsed after the other application servers 30A2 to 30An change the modes to centralized read mode (S212), the application servers 30A2 to 30An change the modes to pre-distributed mode (S213).

On the other hand, the application server 30A1 changes the mode from centralized read mode to centralized update mode (S108). Subsequently, the application server 30A1 updates the shared data (S109). Subsequently, when the application server 30A1 finishes all update transactions (S110), it changes the mode from centralized update mode to centralized read mode (S111). When a given period has elapsed after the application server 30A1 changes the mode to centralized read mode (S112), the application server 30A1 changes the mode to pre-distributed mode (S113). As a result, all the application servers 30A1 to 30An are placed in pre-distributed mode.

The application servers 30A1 to 30An receive notification (S113A, S213A) from one another and recognize that all the application servers 30A1 to 30An are placed in pre-distributed mode (S114, S214) and then change the modes to distributed mode (S115, S215). In this case, the application servers 30A1 to 30An may change the modes from pre-distributed mode to distributed mode in synchronization with one another.

As described above, if any one of the application servers 30 starts an update transaction when the application servers 30 are all placed in distributed mode, the application servers 30 change the modes from distributed mode to centralized read mode via pre-centralized mode. Subsequently, the one application server 30 changes the mode from centralized read mode to centralized update mode so as to perform an update. Subsequently, when the one application server 30 finishes the update, the application servers 30 change the modes from centralized read mode to distributed mode via pre-distributed mode.

Figure 10:
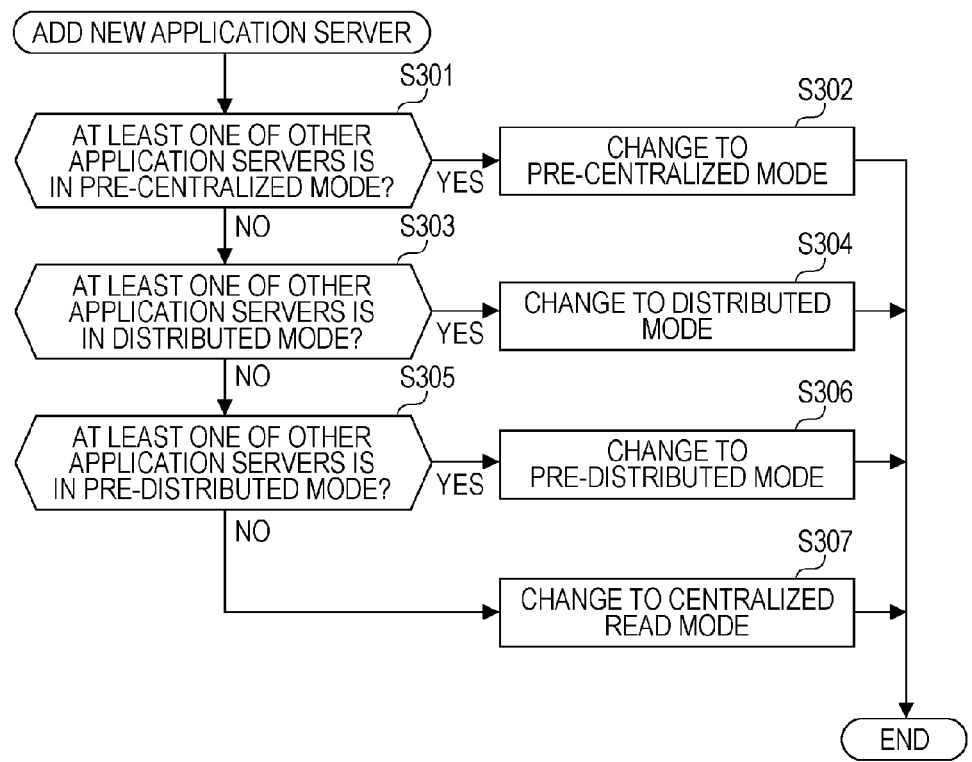
FIG. 10 shows the flow of processes performed when determining the mode of an application server 30 newly added to the information processing system 10.

FIG. 10 shows the flow of processes performed when determining the mode of an application server 30 newly added to the information processing system 10. The information processing system 10 includes a newly added application server 30. The selection unit 60 of the application server 30 newly added to the information processing system 10 makes determinations as shown in FIG. 10 and selects the mode in accordance with the determinations.

First, the selection unit 60 determines whether at least one of the other application servers 30 is placed in pre-centralized mode (S301). If at least one of the other application servers 30 is placed in pre-centralized mode (YES in S301), the selection unit 60 changes the mode to pre-centralized mode (S302).

If none of the other application servers 30 is placed in pre-centralized mode (NO in S301), the selection unit 60 determines whether at least one of the other application servers 30 is placed in distributed mode (S303). If none of the other application servers 30 is placed in pre-centralized mode and if at least one of the other application servers 30 is placed in distributed mode (YES in S303), the selection unit 60 changes the mode to distributed mode (S304).

Subsequently, if each of the other application servers 30 is placed in none of pre-centralized mode and distributed mode (NO in S303), the selection unit 60 determines whether at least one of the other application servers 30 is placed in pre-distributed mode (S305). If each of the other application servers 30 is placed in none of pre-centralized mode and distributed mode and if at least one of the other application servers 30 is placed in pre-distributed mode (YES in S305), the selection unit 60 changes the mode to pre-distributed mode (S306).

Subsequently, if all the other application servers 30 are placed in none of pre-centralized mode, distributed mode, and pre-distributed mode (NO in S305), the selection unit 60 changes the mode to centralized read mode (S307). By determining the mode in the above-mentioned way, the application server 30 newly added to the information processing system 10 is also allowed to access the shared data while maintaining data integrity with the other application servers 30.

Figure 11:
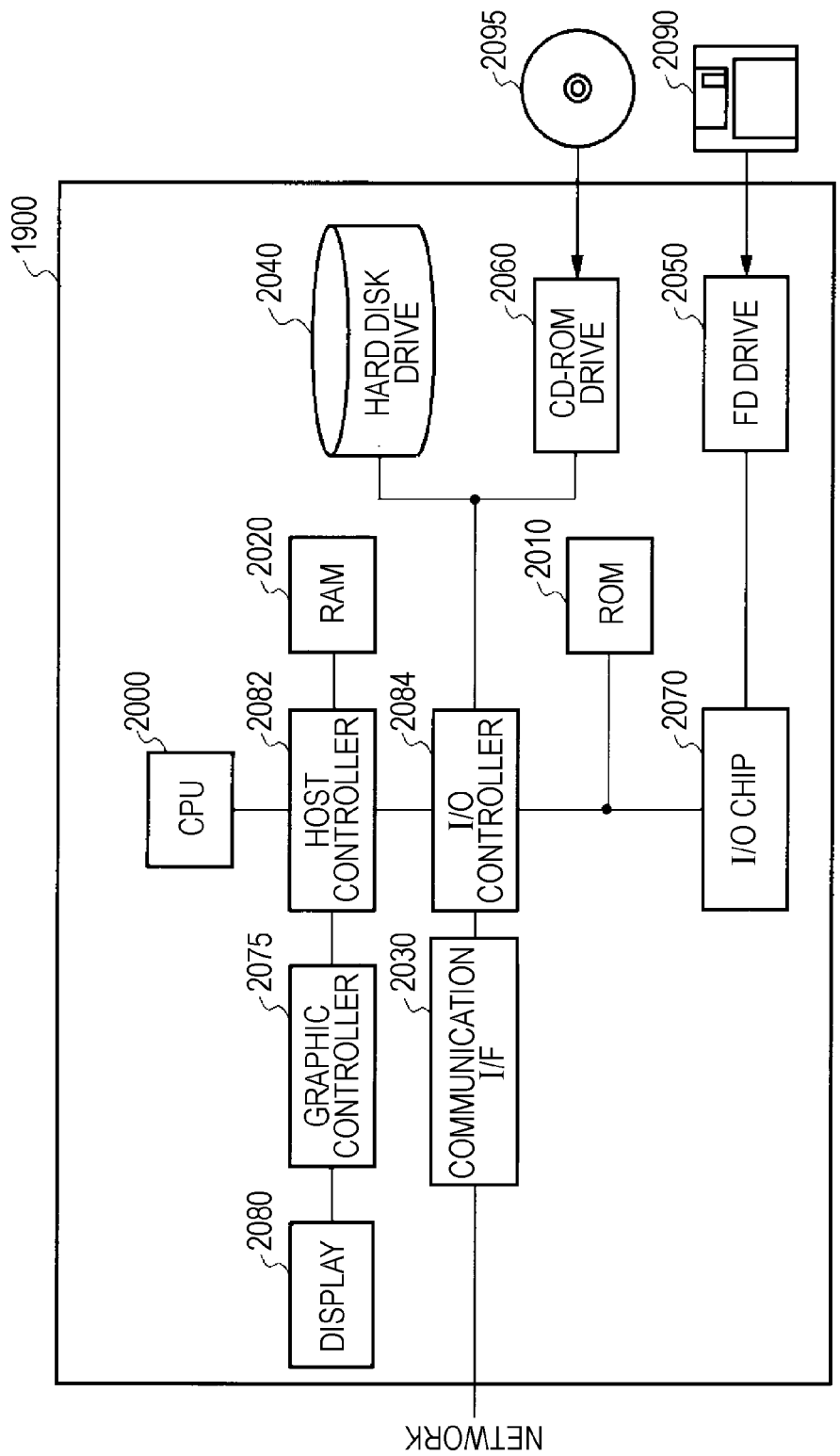
FIG. 11 shows an example hardware configuration of a computer 1900 according to this embodiment.

FIG. 11 shows an example hardware configuration of a computer 1900 according to this embodiment. The computer 1900 according to this embodiment includes a CPU peripheral unit, an input/output unit, and a legacy input/output unit.

The CPU peripheral unit includes a CPU 2000, a RAM 2020, a graphic controller 2075, and a display 2080, which are coupled to one another via a host controller 2082. The input/output unit includes a communication interface 2030, a hard disk drive 2040, and a CD-ROM drive 2060, which are coupled to the host controller 2082 via an input/output controller 2084. The legacy input/output unit includes a ROM 2010, a flexible disk drive 2050, and an input/output chip 2070, which are coupled to the input/output controller 2084.

The host controller 2082 couples between the RAM 2020, and the CPU 2000 configured to access the RAM 2020 at a high transfer rate and the graphic controller 2075. The CPU 2000 operates on the basis of programs stored in the ROM 2010 and RAM 2020 so as to control each component. The graphic controller 2075 acquires image data generated by the CPU 2000 or the like on a frame buffer provided in the RAM 2020 and displays the acquired image data on a display unit 2080. Alternatively, the graphic controller 2075 may include a frame buffer for storing image data generated by the CPU 2000 or the like.

The input/output controller 2084 couples between the host controller 2082, and the communication interface 2030, which is a relatively high-speed input/output device, the hard disk drive 2040, and the CD-ROM drive 2060. The communication interface 2030 is coupled to other apparatuses via a network. The hard disk drive 2040 stores a program and data to be used by the CPU 2000 of the computer 1900. The CD-ROM drive 2060 reads out a program or data from the CD-ROM 2095 and provides the read-out program or data to the hard disk drive 2040 via the RAM 2020.

Also coupled to the input/output controller 2084 are the ROM 2010 and relatively low-speed input/output devices, such as the flexible disk drive 2050 and the input/output chip 2070. The ROM 2010 stores a boot program to be executed at a boot of the computer 1900, a program dependent on the hardware of the computer 1900, and the like. The flexible disk drive 2050 reads out a program or data from the flexible disk 2090 and provides the read-out program or data to the hard disk drive 2040 via the RAM 2020. The input/output chip 2070 couples the flexible drive 2050 to the input/output controller 2084, as well as couples various input/output devices to the input/output controller 2084, for example, via a parallel port, a serial port, a keyboard port, a mouse port, and the like.

A program stored in a recoding medium such as the flexible disk 2090, the CD-ROM 2095, or an integrated circuit (IC) card is installed into the hard disk drive 2040 via the RAM 2020 by the user and then executed by the CPU 2000.

A program installed into the computer 1900 and intended to cause the computer 1900 to function as one application server 30 includes an execution module, an access control module, a cache module, a distributed control module, and a selection module. This program or these modules operates the CPU 2000 and the like in order to cause the computer 1900 to function as the execution unit 52, access control unit 54, cache unit 56, distributed control unit 58, and selection unit 60.

In other words, when such a program is read by the computer 1900, the execution unit 52, access control unit 54, cache unit 56, distributed control unit 58, and selection unit 60 are realized as specific means in which software and the above-mentioned various hardware resources collaborate with each other. Also, by performing operations on information or processing information using these specific means in accordance with the use objective of the computer 1900 according to this embodiment, a unique application server 30 according to the use objective is constructed.

For example, if communications are performed between the computer 1900 and an external apparatus or the like, the CPU 2000 executes a communication program loaded in the RAM 2020 and, on the basis of a process written in the communication program, instructs the communication interface 2030 to perform a communication process. Under the control of the CPU 2000, the communication interface 2030 reads out transmission data stored in a transmission buffer area or the like provided in a storage device such as the RAM 2020, hard disk drive 2040, flexible disk 2090, or CD-ROM 2095 and transmits the read-out transmission data to a network, or writes reception data received via a network into a reception buffer area or the like provided in a storage device. As described above, the communication interface 2030 may transmit transmission data to a storage device or receive reception data from a storage device using the DMA (direct memory access) method. Alternatively, the CPU 2000 may read out data from a storage device or the communication interface 2030, which is the transmission source, and may write the read-out data into the communication interface 2030 or a storage device, which is the transmission destination, so as to transfer transmission data or reception data.

Also, the CPU 2000 loads all or the necessary files, databases, and the like stored in an external storage device such as the hard disk drive 2040, CD-ROM drive 2060 (CD-ROM 2095), or flexible disk drive 2050 (flexible disk 2090) into the RAM 2020 using DMA transfer or the like and performs various processes on the data loaded in the RAM 2020. Then, the CPU 2000 writes the resultant data back into the external storage device using DMA transfer or the like. In such a process, the RAM 2020 is considered as an apparatus for temporarily retaining the data stored in the external storage device. Therefore, in this embodiment, the RAM 2020, external storage devices, and the like are each referred to as a "memory," a "storage unit," a "storage device," or the like. In this embodiment, various programs and various types of information such as data, tables, and databases are stored in such storage devices and are subjected to information processing. Incidentally, the CPU 2000 may read or write data from or into a cache memory holding a part of the RAM 2020. In this case, the cache memory also plays a part of the function of the RAM 2020. Therefore, in this embodiment, the cache memory is also referred to as the "RAM 2020," a "memory," or a "storage device" except for a case where the cache memory and RAM 2020 or the like are shown independently.

Also, the CPU 2000 performs various processes specified by a command string of a program and including various operations, information processing, condition judgment, and retrieval or replacement of information described in this embodiment, on data read out from the RAM 2020 and then writes the resultant data back into the RAM 2020. For example, if the CPU 2000 performs condition judgment, it judges whether the variables shown in this embodiment meet corresponding conditions such as a condition that each variable must be larger, smaller, equal to or larger than, equal to or smaller than, or equal to other variables or constants. If such a condition is met (or unmet), the condition judgment is branched to a different command string or a sub-routine is called.

Also, the CPU 2000 is allowed to retrieve information included in a file, a database, or the like stored in a storage device. For example, if multiple entries in which the attribute value of a first attribute is associated with the attribute value of a second attribute are stored in a storage device, the CPU 2000 retrieves an entry in which the attribute value of the first attribute meets a specified condition, from among the multiple entries and reads out the attribute value of the second attribute stored in the entry. Thus, the CPU 2000 obtains the attribute value of the second attribute associated with the first attribute meeting the specified condition.

The above-mentioned program or modules may be stored in an external recording medium. Among such recording media are the flexible disk 2090 and CD-ROM 2095 as well as optical recording media such as a digital versatile disc (DVD) and a compact disc (CD), magneto-optical recording media such as a magneto-optical (MO) disk, tape media, and semiconductor memories such as an IC card. Also, a storage device, such as a hard disk or a random access memory (RAM), provided in a server system connected to a dedicated communication network or the Internet may be used as a recording medium and the above-mentioned program stored in such a storage device may be provided to the computer 1900 via a network.

Note that the above-mentioned description of the present invention does not cover all features essential to the invention. Thus, there is no specific description of details such as "perform an operation before performing another operation" about the order of performance of the processes, such as operations, steps, and stages, of the apparatus(es), system(s), program(s), and/or method(s) described in the appended claims, specification, and accompanying drawings and that these processes may be performed in an arbitrary order unless an output produced in a preceding process is used in a subsequent process. While the flow of the operations is described using terms such as "first," "then," and the like in the claims, specification, and drawings for convenience sake, such terms do not mean that the operations always must be performed in that order.

Subcombinations of the features are also included in the invention.

While the present invention has been described using the embodiment thereof, the technical scope of the invention is not limited to the description of the embodiment. It will be apparent for those skilled in the art that various changes and modifications can be made to the above-mentioned embodiment. Also, it will be apparent from the description of the appended claims that such changed or modified embodiments can also fall within the technical scope of the invention.

We claim:

1. A first application server, comprising a computer, and configured to interface with: a database server having shared data; a centralized control unit; and a plurality of additional application servers; said first application server comprising:
   a cache unit which caches at least a portion of the shared data;
   an access control unit coupled to said cache unit and the database server;
   an execution unit coupled to said access control unit, said access control unit obtaining a request to access the shared data from said execution unit;
   a distributed control unit; and
   a selection unit coupled to said access control unit, said distributed control unit, the plurality of additional application servers, and the centralized control unit, said selection unit selecting one of a distributed mode wherein a lock associated with said request is obtained from said distributed control unit, a centralized read mode wherein a lock associated with said request is obtained from the centralized control unit, and a centralized update mode wherein a lock associated with said request is obtained from the centralized control unit;
   wherein said distributed mode permits reading from said cache and reading from the database server but prohibits updating the database server; said centralized read mode prohibits reading from said cache and updating the database server but permits reading from the database server; and said centralized update mode prohibits reading from said cache but permits reading from and updating the database server.

2. The first application server of claim 1, wherein said selection unit further selects one of a pre-centralized mode which permits reading from the database server but prohibits reading from said cache and updating the database server, and a pre-distributed mode which permits reading from the database server but prohibits reading from said cache and updating the database server; and wherein said selection unit:
- transitions from said distributed mode to said pre-centralized mode when updating the shared data or if at least one of the plurality of additional application servers is in pre-centralized mode; and
- transitions from said pre-centralized mode to said centralized read mode when each of said first application server and the plurality of additional application servers is in any one of said pre-centralized mode, said centralized read mode, and said centralized update mode.

3. The first application server of claim 2, wherein said selection unit:
- transitions from said centralized read mode to said centralized update mode when updating the shared data;
- transitions from said centralized update mode to said centralized read mode when finished updating the shared data;
- transitions from said centralized read mode to said pre-distributed mode when each of said first application server and the plurality of additional application servers is in any one of said centralized read mode and said centralized update mode or if at least one of the plurality of additional applications servers is in said pre-distributed mode; and
- transitions from said pre-distributed mode to said distributed mode when each of said first application server and the plurality of additional application servers is in any one of said pre-distributed mode, said distributed mode, and said pre-centralized mode.

4. A system comprising:
- a computer comprising a database server having shared data;
- a centralized control unit; and
- a plurality of application servers each comprising a respective one of a plurality of additional computers, each of said plurality of application servers in turn comprising:
  - a cache unit which caches at least a portion of the shared data;
  - an access control unit coupled to said cache unit and the database server;
  - an execution unit coupled to said access control unit, said access control unit obtaining a request to access the shared data from said execution unit;
  - a distributed control unit; and
  - a selection unit coupled to said access control unit, said distributed control unit, other ones of the plurality of application servers, and the centralized control unit, said selection unit selecting one of a distributed mode wherein a lock associated with said request is obtained from said distributed control unit, a centralized read mode wherein a lock associated with said request is obtained from the centralized control unit, and a centralized update mode wherein a lock associated with said request is obtained from the centralized control unit;
  wherein said distributed mode permits reading from said cache and reading from the database server but prohibits updating the database server; said centralized read mode prohibits reading from said cache and updating the database server but permits reading from the database server; and said centralized update mode prohibits reading from said cache but permits reading from and updating the database server.

5. The system of claim 4, wherein said selection unit further selects one of a pre-centralized mode which permits reading from the database server but prohibits reading from said cache and updating the database server, and a pre-distributed mode which permits reading from the database server but prohibits reading from said cache and updating the database server; and wherein said selection unit:
- transitions from said distributed mode to said pre-centralized mode when updating the shared data or if at least one of said plurality of application servers is in pre-centralized mode;
- transitions from said pre-centralized mode to said centralized read mode when each of said plurality of application servers is in any one of said pre-centralized mode, said centralized read mode, and said centralized update mode.

6. The system of claim 5, wherein said selection unit:
- transitions from said centralized read mode to said centralized update mode when updating the shared data;
- transitions from said centralized update mode to said centralized read mode when finished updating the shared data;
- transitions from said centralized read mode to said pre-distributed mode when each of said plurality of application servers is in any one of said centralized read mode and said centralized update mode or if at least one of said plurality of application servers is in said pre-distributed mode; and
- transitions from said pre-distributed mode to said distributed mode when each of said plurality of application servers is in any one of said pre-distributed mode, said distributed mode, and said pre-centralized mode.

* * * * *